United States Patent [19]

Eller

[11] 4,138,202

[45] Feb. 6, 1979

[54] HYDRAULIC MOTOR SYSTEM FOR DRIVING A SUBMERSIBLE IMPELLER PUMP IN WHICH REVERSAL OF HYDRAULIC FLOW IS PREVENTED

[76] Inventor: J. Marlin Eller, 204 NE. 8th Terr., Deerfield Beach, Fla. 33441

[21] Appl. No.: 759,541

[22] Filed: Jan. 14, 1977

Related U.S. Application Data

[63] Continuation-in-part of Ser. No. 747,196, Dec. 3, 1976, abandoned.

[51] Int. Cl.² .................. F04B 9/10; F04B 49/10; F04B 17/00
[52] U.S. Cl. .................. 417/47; 417/63; 417/390; 417/405; 417/440; 60/464
[58] Field of Search .......... 417/390, 308, 47, 440, 417/405, 408, 409, 407, 406, 63; 60/466, 468, 464, 494, 477; 137/559

[56] References Cited

U.S. PATENT DOCUMENTS

| | | | |
|---|---|---|---|
| 2,020,956 | 11/1935 | Norling | 417/406 |
| 2,100,560 | 11/1937 | Kennedy | 417/406 |
| 3,123,007 | 3/1964 | Orr | 417/390 |
| 3,183,669 | 5/1965 | McGuire | 60/464 |
| 3,370,423 | 2/1968 | Vaughan | 60/464 |
| 3,522,999 | 8/1970 | Liles | 417/282 |
| 3,623,320 | 11/1971 | Moore | 60/477 |
| 3,895,490 | 7/1975 | Pachins | 60/464 |
| 3,910,728 | 10/1975 | Sloan | 417/390 |
| 4,017,221 | 4/1977 | Dezelan | 60/494 |

Primary Examiner—William L. Freeh
Assistant Examiner—Thomas I. Ross
Attorney, Agent, or Firm—Oltman and Flynn

[57] ABSTRACT

The present hydraulic system for driving a submersible pumping unit has an above-ground pump for pumping oil through a hydraulic motor in the submersible pumping unit, and a check valve between the above-ground pump and that hydraulic motor to prevent the reverse flow of oil after the submersible pumping unit is turned off. A pressure regulating valve limits the oil pressure to the hydraulic motor. The inlet flow to the above-ground pump is filtered.

2 Claims, 1 Drawing Figure

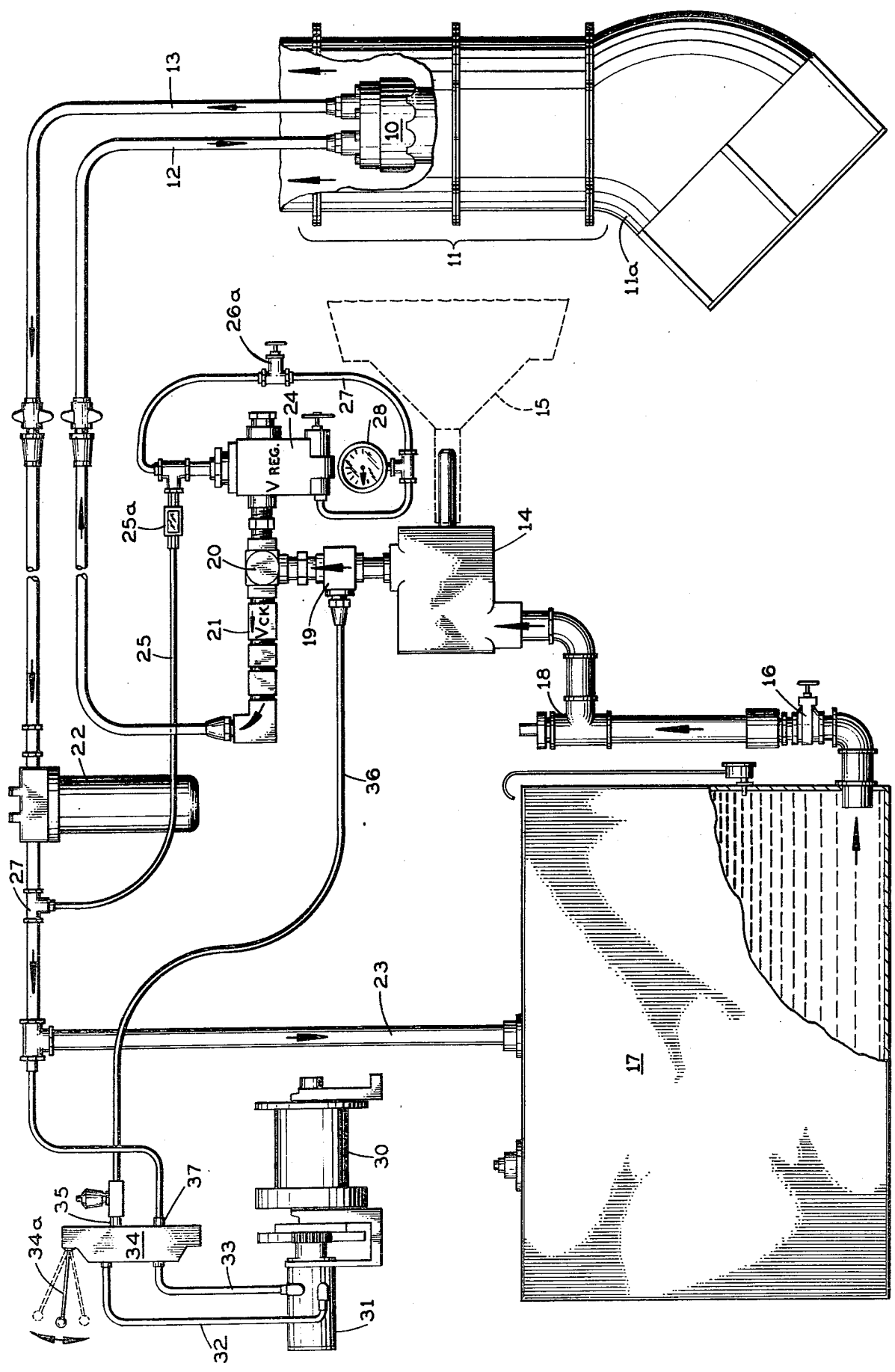

HYDRAULIC MOTOR SYSTEM FOR DRIVING A SUBMERSIBLE IMPELLER PUMP IN WHICH REVERSAL OF HYDRAULIC FLOW IS PREVENTED

RELATED APPLICATION

This application is a continuation-in-part of application Ser. No. 747,196 filed on Dec. 3, 1976, by the present inventor and now abandoned.

BACKGROUND OF THE INVENTION

Submersible pumping units in use heretofore have included a hydraulic motor driving an axial flow pump and both mounted in a casing that is lowered into a water-filled ditch, trench or excavation in the ground to pump the water up through a discharge pipe extending on the opposite side of the hydraulic motor from the axial flow pump. The hydraulic motor is connected through hoses or pipes to an above-ground pump, which pumps oil through the hydraulic motor to drive it, with the return flow of oil going back to an above-ground tank which supplies the oil to the above-ground pump.

The hydraulic and the pump in the submersible pumping unit are stopped by turning off the above-ground pump. When this happens, the water in the discharge pipe above the submersible pump unit tends to flow back down by gravity and rotate the impeller of the submerged pump in reverse. This pump, in turn, tends to drive the hydraulic motor in reverse, causing the latter to pump oil in reverse through the above-ground pump. An important aspect of the present invention relates to a novel check valve arrangement for preventing such reverse flow of oil through the hydraulic motor in the submersible pumping unit and from there through the above-ground pump.

Another aspect of this invention is directed to filtering out any damaging particles which ar pumped out of the oil tank toward the inlet of the above-ground pump.

Another aspect of this invention is concerned with relieving excessive pressure at the outlet side of the above-ground pump, such as during abnormal operating conditions or upon starting the prime mover for this pump.

SUMMARY OF THE INVENTION

In the presently-preferred embodiment, the hydraulic system for operating the hydraulic motor in the submersible pumping unit, as described, includes a check valve on the outlet side of the above-ground pump. This check valve passes oil from that pump to the hydraulic motor in the submersible pumping unit but automatically blocks any reverse flow of such oil, thereby acting as a brake preventing reverse rotation of the hydraulic motor.

In this presently-preferred embodiment a pressure regulating valve is connected in a bypass line with a sight glass extending between the outlet side of the above-ground pump and the low pressure return to the oil tank. This pressure regulating valve relieves any excess pressure and normally maintains a constant oil pressure for operating the hydraulic motor in the submersible pumping unit.

Also, this presently-preferred embodiment has a filter/strainer between the oil tank and the inlet of the above-ground pump to filter out any particles coming from the reservoir that might damage that pump.

The objects and advantages of the present invention will be apparent from the following detailed description of the presently-preferred embodiment thereof, which is shown schematically in the single FIGURE of the accompanying drawing.

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

The hydraulic system of the present invention is shown connected to a submersible pumping unit which includes a hydraulic motor 10 of known design mounted inside a casing 11 which, as shown, has an inclined intake scoop 11a at its lower end. The hydraulic motor 10 has a rotary output shaft coupled to the impeller of an axial flow pump of known design, which is located inside the casing 11 just above the latter's intake scoop 11a.

This submersible pumping unit may be lowered into a ditch, trench or excavation in the ground, or it may be held suspended in a vertical well casing in the ground or at a substantially horizontal irrigation conduit in the ground. The casing 11 of the submersible pumping unit may be suspended from cables extending down from a winch on a ground-level mobile unit, such as shown in U.S. Pat. No. 3,907,463.

The hydraulic motor 10 is driven in one rotational direction so that it will rotate the pump impeller in a direction for pumping the water longitudinally through the casing 11 past the hydraulic motor. For this purpose the hydraulic motor 10 is provided with an inlet hose 12 and a return hose 13, both of which extend down to the hydraulic motor 10 from the aforementioned ground-level mobile unit.

The upper end of the hydraulic motor inlet hose 12 is operatively connected to the outlet side of a constant volume vane pump 14 or other type hydraulic pump driven by a prime mover 15, which may be an electric motor or a diesel engine. The inlet side of the pump 14 is operatively connected through a normally open, manually operated gate valve 16 to the lower end of an oil tank 17. All of these components are in the above-ground mobile unit.

In accordance with one feature of the present system, a screen type strainer/filter 18 is located between the outlet side of the gate valve 16 and the inlet side of the above-ground pump 14 to protect the latter against metal particles which sometimes are left inside the oil tank 17 when its side and bottom walls are welded to one another.

The outlet side of the above-ground pump 14 is connected through two successive T-fittings 19 and 20 to the inlet hose 12 for the hydraulic motor 10. In accordance with an important aspect of this invention, a check valve 21 of known design is connected between the second T-fitting 20 and the hydraulic motor inlet hose 12, for a purpose explained hereinafter. This check valve permits oil to flow from the pump 14 to the hose 12 but blocks oil from flowing in the reverse direction.

The return hose 13 from the hydraulic motor 10 is operatively connected through an oil filter 22 of known design to the low pressure return line 23 for the oil tank 17.

A bypass circuit is connected between the outlet side of the above-ground pump 14 and the return line 23 for the oil tank. This bypass circuit includes a fitting 24 containing a pressure regulating valve of known design which has its inlet connected to the second T-fitting 20 at the outlet side of the pump. This pressure regulating valve has a bypass outlet connected through a line 25 to a return line 23. Whenever the pump pressure exceeds 2,000 psi, for example, the pressure regulating valve in fitting 24 bypasses the excess pump pressure to the return line 23. The valve 26a is opened to relieve pressure on the system for engine starting and closed to raise pressure to put system into operation; after closing this valve, operating pressure can be observed on psi gauge 28.

A fitting 25a having a viewing window is connected between the bypass outlet of the pressure regulating valve in the fitting 24 and the bypass line 25. The user of the present apparatus can observe the existence of a bypass flow into conduit 25 through fitting 25a and thereby be informed of any abnormality in the system's operation which might require a shut down or adjustment to correct the problem.

The pressure gauge 28 is connected in line 27, which is connected around regulating valve 24, and to the fitting 24 to provide a visual reading of the pump output pressure.

The above-ground pump 14 also may be used to provide the motive power for the winch 30 on the mobile unit that is used to lower and raise the submersible pumping unit.

The winch 30 is rotated by a reversible second hydraulic motor 31 having hydraulic lines 32 and 33 connected to the motor ports of a manually operated four-way valve 34 of the closed-center type. Valve 34 has an inlet port at 35 which is connected to a line 36 leading from the first T-fitting 19 at the outlet side of pump 14. Valve 34 has a return port at 37 which is connected to the oil tank return line 23.

Normally, with the handle 34a of valve 34 in its centered position, this valve is closed and the winch 30 is not operated.

When the valve handle 34a is displaced in one direction from its closed-center position, the valve inlet port 35 will be connected to the line 32 leading to one side of the hydraulic motor 31 and the other motor line 33 will be connected to the return port 37 of the valve. Consequently, the output pressure from the pump 14 will drive the hydraulic motor 31 to operate the winch 30 in the direction corresponding to the position of valve handle 34a.

When the valve handle 34a is displaced in the opposite direction from its closed-center position, the valve inlet port 35 will be connected to the hydraulic motor line 33 and the other motor line 32 will be connected to the return port 37 of the valve. Consequently, the hydraulic motor 31 will be operated in the opposite direction by the output pressure from the pump 14 so as to drive the winch 30 in that direction.

When the submersible pumping unit is stopped (by turning off the above-ground pump 14), the water in the discharge pipe tends to flow back down through the casing 11 and rotate the impeller of the submerged pump in the reverse direction from its normal pumping direction (when driven by the hydraulic motor 10). Such reverse rotation of the pump impeller would be imparted to the hydraulic motor 10, causing the latter to operate in reverse and pump oil from hose 13 into hose 12. (It will be understood that under these conditions the submerged pump now is acting as a hydraulic motor and the hydraulic motor 10 is acting as a pump).

This reverse flow can be damaging to the below-ground pump 11 and the above-ground pump 14 in the present hydraulic system. The aforementioned check valve 21 prevents this reverse flow of oil from the hydraulic motor 10 through hose 12 back to the outlet side of pump 14. In effect, the check valve 21 acts as a hydraulic brake which prevents the hydraulic motor 10 from being reversed as a result of the downward rush of water through the casing 11 and over the impeller of the submerged pump.

While the check valve 21 preferably is located between the outlet of the above-ground pump 14 and the inlet hose 12 for the hydraulic motor 10, it is to be understood that the check valve could be located between hose 13 and filter 22, if desired.

I claim:
1. In combination with
    a submersible pumping unit having a rotary pump including an impeller for pumping water up from the ground, a hydraulic motor in driving relationship with said pump for rotating said pump in one direction to pump the water up, and hydraulic lines connected to opposite sides of said hydraulic motor;
  and an above-ground hydraulic system for operating said hydraulic motor in the submersible pumping unit, said hydraulic system including an oil tank, an above-ground pump operatively connected to pump oil from said tank to one of said hydraulic lines of the submersible pumping unit to drive the hydraulic motor for rotating said first-mentioned pump in said one direction, and return conduit means connected between the other of said hydraulic lines for the hydraulic motor in the submersible pumping unit and said oil tank to return the oil from said hydraulic motor to said tank;
  the improvement which comprises:
    anti oil flow reversing check valve means operatively connected in circuit with said lines and said hydraulic motor in the submersible pumping unit acting as a hydraulic brake for preventing said motor from being operated in reverse by the downward flow of water through said first-mentioned pump acting on said impeller when said above-ground pump is shut off;
    a bypass pressure regulating valve connected in series with means including oil viewing means between the outlet side of said above-ground pump and said return conduit means for said oil tank to limit the pressure of the oil which operates said hydraulic motor in the submersible pumping unit by bypass oil flow, said oil viewing means enabling viewing of bypass oil flow through said regulating valve for adjustment purposes;
    a bypass line connected in parallel around said pressure regulating valve;
    a manual valve in said bypass line to be opened when starting said above-ground pump to relieve hydraulic pressure and then closed for operation;
    and a pressure gauge in said bypass line for indicating hydraulic pressure.

2. Apparatus according to claim 1, wherein said check valve means is connected between the outlet side of said above-ground pump and said one hydraulic line for the hydraulic motor in the submersible pumping unit.

* * * * *